(12) United States Patent
Wurster

(10) Patent No.: US 12,199,480 B2
(45) Date of Patent: Jan. 14, 2025

(54) ASSEMBLY METHOD FOR A ROTOR

(71) Applicant: Dr. Ing. h.c. F. Porsche Aktiengesellschaft, Stuttgart (DE)

(72) Inventor: Peter Wurster, Kornwestheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 240 days.

(21) Appl. No.: 17/690,643

(22) Filed: Mar. 9, 2022

(65) Prior Publication Data

US 2022/0376593 A1 Nov. 24, 2022

(30) Foreign Application Priority Data

May 18, 2021 (DE) .................. 10 2021 112 815.3

(51) Int. Cl.
*H02K 16/02* (2006.01)
*H02K 1/2796* (2022.01)
*H02K 1/2798* (2022.01)
*H02K 15/03* (2006.01)

(52) U.S. Cl.
CPC ......... *H02K 16/025* (2013.01); *H02K 1/2796* (2022.01); *H02K 1/2798* (2022.01); *H02K 15/03* (2013.01); *Y10T 29/49012* (2015.01)

(58) Field of Classification Search
CPC .... H02K 16/025; H02K 15/03; H02K 15/165; H02K 1/278; H02K 11/30; Y10T 29/49012

USPC ................. 29/596, 598, 602.1, 609
See application file for complete search history.

(56) References Cited

U.S. PATENT DOCUMENTS

| 5,463,262 A | * | 10/1995 | Uchida | ............... H02K 1/2773 310/156.55 |
| 11,369,958 B2 | * | 6/2022 | Shartle | ............. B01L 3/502715 |
| 2014/0252911 A1 | | 9/2014 | Hauck | |
| 2018/0076700 A1 | | 3/2018 | Nagai et al. | |

FOREIGN PATENT DOCUMENTS

| DE | 102013205928 | | 10/2014 | |
| DE | 102017123703 | * | 4/2019 | ............ H02K 1/276 |
| DE | 102017123703 A1 | | 4/2019 | |
| WO | 2021032239 | | 2/2021 | |

* cited by examiner

*Primary Examiner* — Thiem D Phan
(74) *Attorney, Agent, or Firm* — Gerald E. Hespos; Michael J Porco

(57) ABSTRACT

A rotor (1) with a rotation axis (2) is provided for an electric drive machine (3). The rotor (1) has a plurality of rotor assemblies (4), each of which has a plurality of laminated cores (5) and a number of magnets (7) corresponding to a pole pair arrangement (6). The rotor also has a rotor shaft (8) on which the rotor assemblies (4) are fixed. The rotor assemblies (4) are positioned on the rotor shaft (8) such that they are rectified in accordance with their axial runout (9), while taking into account the pole pair arrangement (6). The rotor can reduce a thermally induced change in imbalance.

8 Claims, 4 Drawing Sheets

ASSEMBLY METHOD FOR A ROTOR

CROSS REFERENCE TO RELATED APPLICATION

This application claims priority under 35 USC 119 to German Patent Appl. No. 10 2021 112 815.3 filed on May 18, 2021, the entire disclosure of which is incorporated herein by reference.

BACKGROUND OF INVENTION

Field of the Invention. The invention relates to a rotor with a rotation axis for an electric drive machine, to an assembly method for such a rotor, to a drive machine for a drivetrain, to a motor vehicle with such a drive machine, to a computer program, and also to a computer program product with such a computer program for performing the assembly method of the rotor.

Related Art. Electric drive machines include a stator and a rotor for converting electrical energy into a torque (or vice versa in generator mode). Such an electric drive machine generally has a rotor shaft with a multiplicity of sheets magnetically insulated from one another and packed to form laminated cores. The laminated cores of permanently excited synchronous machines [PSM] are fit with permanent magnets, for example comprising neodymium, iron and boron or samarium and cobalt. The laminated cores are positioned on the rotor shaft after being fit with the magnets or while still without the magnets. The laminated cores are measured in advance for their concentricity (or eccentricity). Eccentricity is the deviation of the central axis of the inside diameter (that is to say the seating on the rotor shaft) in relation to the outside diameter of the laminated core. The laminated cores then are sorted in an optimized process for least possible imbalance, for example compensating for one another. The appropriately sorted cores then are positioned on the rotor shaft and fixed.

The laminated cores may be heated to an operating temperature of 120° C. to 160° C. The heated laminated cores are subject to thermal expansion, and the thermal expansion leads to a bending moment on the rotor shaft. In the event of elastic deformation, this bending leads to a reversible imbalance. However, the heat can cause the rotor shaft and/or the laminated cores to deform plastically, thereby causing irreversible imbalance. In the best case, these effects occur in an in-line artificial aging, that is to say being put into operation while they are on the production line, so that they can be compensated by balancing. However, such effects also can occur during operation at the customer's premises, and consequently impair the running quality of the rotor.

Against this background, the invention is based on the object of at least partially overcoming disadvantages known from the prior art. The features of the invention will become apparent from the claims. The features of the claims may be combined in any technically meaningful manner, it also being possible for this purpose to use the explanations from the following description and features from the figures that cover additional configurations of the invention.

SUMMARY

The invention relates to a rotor with a rotation axis for an electric drive machine. The rotor comprises rotor assemblies that respectively comprise laminated cores and magnets corresponding to a specified desired pole pair arrangement. The rotor also has a rotor shaft on which the rotor assemblies are fixed. The rotor assemblies are positioned on the rotor shaft so that they are rectified in accordance with their axial runout, while taking into account the pole pair arrangement.

In the text that follows, reference is made to the rotation axis when, without any explicitly different indication, the axial direction, radial direction or circumferential direction and corresponding terms are used. Unless explicitly indicated to the contrary, ordinal numbers used in the description above and below serve only for clear distinction and do not reflect any order or priority of the components denoted. An ordinal number greater than one does not necessarily require another such component to be present.

The rotor can be used conventionally in an electric drive machine, such as a PSM, that may be designed conventionally. The rotor shaft is rotatable about its rotation axis, tolerances having the effect that there is an imbalance to be minimized, for example because of a deviation in the concentricity (eccentricity) in relation to the rotation axis. In one embodiment, the rotor shaft is of a one-piece design and/or comprises one or more pinions for delivering a torque to a transmission. The eccentricity is a measure of the geometrical center of the outer circumference (here of the shaft seating receiving the rotor assemblies) in relation to the actual rotational axis, the rotation axis that is created by the bearing seats being taken here as a reference in the context considered.

A rotor assembly is a laminated core with the magnets inserted in accordance with the desired number of poles or pole pair arrangement. This does not mean that each rotor assembly must comprise a set of magnets of its own. In one embodiment, plural laminated cores are provided with common magnets, that is to say with magnets having a longer axial extent than one of the laminated cores. In another embodiment, each laminated core is provided with magnets of its own, so that each rotor assembly is autonomous from another rotor assembly.

Each laminated core is put together from plural axially stacked rotor sheets that may be designed conventionally. Each rotor sheet comprises insert receptacles for the magnets and a central shaft receptacle. A laminated core has this structure with a greater axial extent. The laminated cores often are brought-in parts. Such a laminated core has a rotation axis, which in the ideal case is congruent with the rotation axis of the rotor shaft once the laminated core has been mounted on the shaft. In reality, tolerances cause a deviation, both internally and as a result of the assembly tolerance.

The rotor comprises plural rotor assemblies, for example 3 to 8, that are fixed on the rotor shaft, for example by a press fit.

It has been found that at least most of the aforementioned effects of the thermally caused bending moment on the rotor shaft are caused by an axial runout of the laminated cores. The axial runout is the inclination of the plane of the laminated core or of the rotor assembly in relation to its (own) central rotation axis or in relation to the rotation axis of the rotor shaft. If for example, in an extreme case, two rotor assemblies with opposite axial runout (that is to say inclined toward one another) are arranged next to one another, they push away from one another on the side of the touching (outer) edges solely or mainly because of their thermal expansion, and therefore have a lever effect on the rotor shaft with their radial extent. This induces the bending moment. Such an axial runout is for example up to 0.3 mm in the case of a disk diameter of from 120 mm to 160 mm.

The rotor assemblies described herein are mounted to be rectified as much as possible in accordance with their axial runout. In the ideal state, the rotor assemblies are positioned and fixed so that the individual laminated cores are parallel to one another on the rotor shaft. Rotor assemblies that are positioned with a rectified axial runout have a rectified inclination about a respective axis (parallel to one another) in the plane normal to the rotation axis. This avoids a lever effect caused by thermal expansion. On account of the pole pair arrangement and the consequence that the rotor assemblies (with smallest possible angular tolerance with respect to the rotation axis) must be aligned in each case identically to one another, an ideal rectification of the axial runout is restricted. For example, with three pole pairs, only three angular orientations (turned by 120° in relation to one another) are possible. In an extreme case of two rotor assemblies having maximum axial runouts that are opposite in relation to one another (that is to say not rectified), the lever effect because of the thermal expansion can be reduced, nevertheless, approximately 66% by a relative angular rotation by 120°, assuming an ideally planar axial runout, that is to say a linear transition. As opposed to an ideal rectification of the axial runouts, the term rectified is understood as meaning at least a rectification appropriate for the poles, that is with a pole deviating angle of less than the fraction of one entire revolution [360°; numerator] divided by the number of pole pairs, namely half the number of (pole-effective) magnets. The above example has a pole deviating angle of less than 120°. The laminated cores or rotor assemblies may be preselected and sorted so that the rectification appropriate for the poles is less than 60°, particularly preferably less than 30°.

Significantly, the time period for an in-line artificial aging of the above-described rotor can be shortened or even can be omitted. In this way, a considerable time saving is achieved in the production of the rotor.

The invention also relates to an assembly method for a rotor as described above. The method includes:

a. providing laminated cores;
b. measuring the laminated cores;
c. providing magnets;
d. connecting the respective laminated cores to a specified number of the magnets to form a rotor assembly with a corresponding pole pair arrangement;
e. providing the rotor shaft;
f. positioning the rotor shaft and the rotor assemblies in relation to one another; and
g. fixing the rotor shaft and the rotor assemblies to one another to form a rotor, with the rotor assemblies being positioned on the rotor shaft so that they are rectified in accordance with their axial runout determined in step of measuring the laminated cores, while taking into account the pole pair arrangement.

An advantageous assembly method for the rotor according to the foregoing description is hereby presented and, without excluding generality, to this extent reference is made to the description given there. It should be pointed out that, unless they are building one on the other, the steps can be performed in any desired sequence. For example, the first three steps can be performed independently of one another, according to requirements (for example in a Kanban system) or can be performed at the same time. The step of measuring the laminated cores can be performed after the step of connecting the laminated cores to the magnets. The first three or four steps can be performed at a separate location, such as a supplier's premises, and the measurement data with respect to the laminated cores or the rotor assembly can be stored. The first four steps are repeated (for a further rotor assembly in each case) as often as it takes until the desired number of rotor assemblies for the rotor to be assembled have been provided. The last one or two steps identified above can be repeated a corresponding number of times or the desired number of rotor assemblies can be positioned on the rotor shaft all at the same time and subsequently are fixed.

The first three steps and the step of providing the rotor shaft must be completed before positioning the rotor shaft and the rotor assemblies in relation to one another. However, the step of connecting the respective laminated cores to a specified number of the magnets to form a rotor assembly with a corresponding pole pair arrangement may not be performed until after fixing the rotor shaft and the rotor assemblies to one another. The step of connecting the laminated cores to a specified number of the magnets to form a rotor assembly with a corresponding pole pair arrangement is performed in some embodiments before positioning the rotor shaft and the rotor assemblies in relation to one another, and particularly with the rotor assemblies being autonomous from one another, that is to say comprising separate magnets from one another. Furthermore, the step of positioning the rotor shaft and the rotor assemblies in relation to one another and the step of fixing the rotor shaft and the rotor assemblies to one another to form a rotor are performed repeatedly for a rotor assembly. For example, for a press-fit connection, the step of positioning the rotor shaft and the rotor assemblies in relation to one another and the step of fixing the rotor shaft and the rotor assemblies to one another to form a rotor run smoothly into one another (for example when using thermal expansion and corresponding temperature control). In one embodiment, all of the method steps can be included in a conventional assembly method or can be performed conventionally in each case. All or most of the steps are performed by automated transporting means and/or robots.

The step of positioning the rotor shaft and the rotor assemblies in relation to one another takes into account the axial runout that has been determined earlier in the method. In one embodiment, the step of measuring the laminated cores is not performed until just before step of positioning the rotor shaft and the rotor assemblies in relation to one another. In the latter step, the positioning also comprises aligning the rotor assemblies according to their axial runout. In one embodiment, this is not the only tolerance that is taken into account when positioning the rotor shaft and the rotor assemblies in relation to one another. As mentioned above, rectification of the axial runout is always subordinated to the pole pair arrangement, that is to say possibly only approximated. In a preferred embodiment, the rectification of the axial runout is given priority over other measures for compensating for tolerances, for example those that cause imbalances.

In one embodiment, this assembly method is followed by a (preferably shortened) in-line artificial aging. In one embodiment, an in-line artificial aging is performed dependently on the achieved degree of rectification of the axial runouts of the rotor assemblies fixed on the rotor shaft. The decision may be based on experience.

In one embodiment, a multiplicity of laminated cores and/or rotor assemblies are sorted on the basis of their respective axial runout and then rotor assemblies that are respectively sorted in relation to one another are positioned on the rotor shaft.

A buffer store may be provided with laminated cores and/or rotor assemblies stored so that they can be mounted on the rotor shaft such that they are rectified in relation to one another with particularly good approximation. The eccentricity of the rotor shaft in relation to the rotor assemblies may be taken into account, with compensation being aimed for. The measures for the sorting may be the circumferential angle orientation of the axial runout, the amount of tolerance of the axial runout, and the eccentricity. Depending on the diversification of events or combinations of tolerances, a corresponding number of buffer stores are kept for a rotor or a rotor shaft. Apart from a longer start-up phase in assembly operation, no time delay or a minor time delay is to be expected.

The step of positioning the rotor shaft and the rotor assemblies in relation to one another may be carried out so that the rotor assemblies are positioned on the rotor shaft in accordance with their eccentricity determined in the step of measuring the laminated cores, and preferably the rotor assemblies are oriented in accordance with their axial runout and/or are positioned in a corresponding sequence.

For minimizing the dynamic imbalance, rotor assemblies may be placed in such a sequence that rotor assemblies with low quality of the concentricity (that is to say great eccentricity) are arranged axially far outside and those with better quality are arranged axially centrally on the rotor shaft. Consequently, the assemblies causing the greatest imbalance are arranged near or directly adjacent to an (optional) balancing disk, and consequently the deforming influence on the rotor shaft and/or adjacent rotor assemblies is reduced. Similarly, rotor assemblies with a greater amount of tolerance of the axial runout may be arranged axially farther outside than rotor assemblies with a smaller amount of tolerance of the axial runout, so that an axial stack that is as compact as possible is obtained on the rotor shaft.

In one embodiment, an optimum of the orientation, that is to say the relative angular position, about the rotation axis of the rotor shaft is formed on the basis of the eccentricity and the axial runout. For example, better rectification of the axial runouts is dispensed with to achieve improved quality of the imbalance. Preferably, better quality of the imbalance is dispensed with to achieve improved rectification of the axial runouts.

The method also may comprise positioning at least one balancing disk on the rotor shaft and machining the balancing disk to a measured imbalance.

The step of positioning at least one balancing disk on the rotor shaft may be performed before, at the same time as or after the step of fixing the rotor shaft and the rotor assemblies to one another to form a rotor. The at least one balancing disk (preferably one on each end, finishing off the rotor assemblies) then is machined as previously known, for example iteratively, to minimize the imbalances. In one embodiment, before the machining of the at least one balancing disk, the imbalance and/or the bending moment because of the thermal expansion of the rotor assemblies is recorded and stored, for example in a computer, as experience, registered with respect to the orientation and sequence of the rotor assemblies as well as their quality.

The method may include measuring the rotor. These measurement data of the rotor, correlated with the measurement data of the rotor assemblies fixed on the rotor shaft and the rotor shaft, and also their relative position, are integrated in a machine learning model.

In this embodiment, a learning algorithm (machine learning model), in which data are taken into account and can be used for improving a control result, is integrated. Such a learning algorithm (also referred to as a deep learning algorithm) is already known from the areas of voice recognition or voice processing and facial recognition, which are characterized in that they are based on sets of data that cannot be sufficiently managed by humans and/or on rules that are only known insufficiently or not known at all. Comparable with a finite element algorithm, such a deep learning algorithm is trivial in the smallest entity, but on account of the complexity (in this case especially the amount of correlating measurement data), the tasks are unsolvable for a human or can only be solved by taking an unacceptable amount of time. Known deep learning algorithms or applicable program libraries are for example TensorFlow®, Keras and Microsoft® Cognitive Toolkit.

Not all of the effects of a change in the imbalance over a running time (that is service life or after an early exchange) or an in-line artificial aging can be sufficiently explained by the eccentricity and axial runouts described here. Because the measuring of the laminated cores or rotor assemblies is provided in any case in this method, it is proposed here that modeling is carried out by machine learning (machine learning model). In this way, effects that cannot be described analytically, or only with difficulty, can also be mapped. In this case, first an integration of the analytically describable domain knowledge into the machine learning model takes place.

Here it is therefore proposed that a machine learning model is used to further improve the solving of the complex task described here. This method may be performed to accompany assembly on an assembly line at a factory. The measurement results, for example for quality assurance, may be included in considerations when decisions are taken in selecting and/or positioning the rotor assemblies of a rotor. For example, a selection and/or arrangement of rotor assemblies accepted as sufficiently straight could lead to better results without or with in-line artificial aging than a selection and/or arrangement of rotor assemblies of another rotor considered to be more optimum. Then the decision is changed correspondingly by means of the machine learning model. In this embodiment of the assembly method, a very large number of different measured values may be recorded, a number of values that make a human analytical decision almost impossible on account of the resultant complexity.

In some aspects of the assembly method, the results of the measuring of the laminated cores are entered as a machine-readable code on the laminated cores or a mount of a transporting means and are read out in the step of positioning the rotor shaft and the rotor assemblies in relation to one another for the positioning or loading up of a buffer store. In one embodiment, the results of the measuring are stored in a corresponding computer to form from them a principle based on experience or a data source for the machine learning model.

The machine learning model may commence in ongoing production, so that the quality obtained as a result of analytical assembly leads to a further increase in quality, without assembly having to be interrupted for laborious series of tests.

A further aspect of the invention relates to a drive machine for a drivetrain. The drive machine comprises a rotor as describe above, a stator corresponding to the rotor and a shaft mounting for the rotor shaft. The rotor may be assembled by the above-described method.

The electric drive machine may be a permanently excited synchronous machine [PSM] that can be used as a torque source (motor mode) and/or as an energy source (generator mode). The rotor may be designed as described above. The stator functions conventionally and may be designed conventionally so that a torque of the electric drive machine can be generated and controlled. The rotor shaft or the rotor may be mounted by means of a shaft mounting, for example a fixed bearing and a movable bearing, such as a rolling bearing. The shaft mounting may be integrated in a motor housing or at least partially arranged in an (integrated) transmission housing. In the latter case, the electric drive machine may be assembled first in the transmission housing. The rotor may be assembled by an assembly method as described above.

The rotor of the electric drive machine is particularly well balanced, and only negligible or minor temperature-induced changes in imbalance occur. Consequently, very smooth running can be achieved in all operating states and a long service life.

The invention also relates to a motor vehicle having at least one propulsion wheel, a drive machine as described above for the propulsion of the motor vehicle by way of the at least one propulsion wheel and a traction battery for supplying the electric drive machine with an electrical power voltage.

The motor vehicle with such a drive machine enables the required electrical power voltage for the propulsion of the motor vehicle to be made available by means of a traction battery. In this case, the traction battery is connected electrically to the drive machine and, depending on the propulsion requirement, for example depending on the position of the so-called gas pedal, supplies the drive machine with a correspondingly required electrical power voltage. The torque (generated in the electric drive machine) can be transferred by way of the rotor shaft (preferably via a stepup transmission and/or a differential) to the at least one propulsion wheel. The propulsion wheels transfer the torque to the underlying surface and thereby drive the motor vehicle forward.

The rotor of the electric drive machine is particularly well balanced, and only negligible or minor temperature-induced changes in imbalance occur. Consequently, very smooth running can be achieved in all operating states and a long service life. Moreover, the power efficiency of the propulsion therefore increases.

The invention also relates to a computer program, comprising a computer program code. The computer program code can be run on at least one computer in such a way that the computer is made to carry out the assembly method on the basis of an embodiment described above. At least one of the computers may be integrated in an edge device of an assembly station, such as an assembly computer or a component of an assembly computer. The computer may communicate with a cloud on which the computer program code is provided.

It should be pointed out that the assembly method is physically performed by one or a plurality of assembly stations and the computer program merely commands the means that are used and, under some circumstances, correspondingly instructs the people involved. The computer program is a superordinated or specialized addition to subprograms which output (for example at the level of the machine code) the actual commands to be executed (for example a movement of a robot arm) or the outputs on a man-machine interface (for example a screen). Preferably, the subprograms run conventionally or are set up for being conventionally run and/or operated by the corresponding automated means.

A computer comprises one or more processors, for example an all-purpose processor (CPU) or microprocessor, RISC processor, GPU and/or DSP. The computer has for example additional elements such as memory interfaces. Optionally or additionally, the terms refer to such a device that is able to run a program provided or incorporated, preferably using a standardized programming language such as for example C++, JavaScript or Python, and/or to control and/or access data storage devices and/or other devices such as input interfaces and output interfaces. The term computer also refers to a multiplicity of processors or a multiplicity of (sub)computers that are interconnected and/or otherwise communicatively connected and possibly share one or more other resources, such as for example a memory.

A (data) memory is for example a hard disk (HDD, SSD, HHD) or a (nonvolatile) solid-state memory, for example a ROM or flash memory [flash EEPROM]. The memory often comprises a plurality of individual physical units or is distributed over a multiplicity of separate devices, as a result of which access thereto takes place via data communication, for example package data service. The latter is a decentralized solution, where memories and processors of a multiplicity of separate computing units are used instead of a (single integral) central on-board computer or in addition to a central on-board computer.

The invention also relates to a computer program product on which a computer program code is stored. The computer program code may be run on at least one computer in such a way that the at least one computer is made to carry out the assembly method on the basis of an embodiment according to the above description. At least one of the computers may be integrated in an edge device of an assembly station, such as an assembly computer or a component of an assembly computer. The computer may communicate with a cloud on which the computer program code is provided.

A computer program product comprising computer program code is for example a medium, for example a RAM, a ROM, an SD card, a memory card, a flash memory card or a disk. As an alternative, a computer program product is stored on a server and is downloadable. As soon as the computer program is made readable by means of a read-out unit (for example a drive and/or installation), the computer program code contained and the method contained therein can be run by a computer, or in communication with a multiplicity of computer-assisted devices, for example according to the above description.

An edge device corresponds to a local server which is arranged at an assembly station, on an assembly line or at a production location and is provided in a specialized form as little distance away as possible and as far as possible without other (interfering) data traffic. Contained therein are all necessary components of a computer, and the edge device is preferably physically separate from the rest of the data processing and is set up alone for the tasks of the machine learning model.

A cloud corresponds in its tasks to an edge device, but by contrast thereto is a remote or at least variously used server or a collection of computers. Under some circumstances, greater computing capacity is available here than in the case of an edge device and/or consequently lower initial costs are involved. Disadvantages, however, are often a data backlog on account of the wide variety of inquiries, and also the data security.

The invention described above is explained in detail below against the relevant technical background with reference to the associated drawings, which show preferred configurations. The invention is not in any way restricted by the purely schematic drawings, and it should be noted that the drawings are not to scale and are not suitable for defining relative sizes.

DETAILED DESCRIPTION

Figure 1:
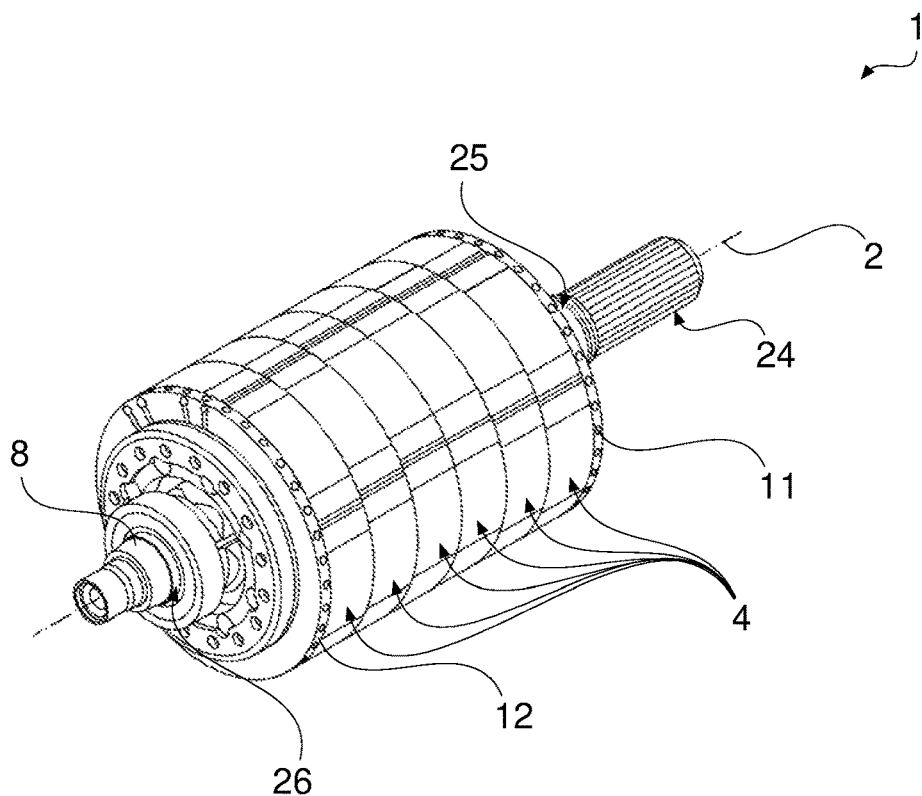
FIG. 1 is a perspective view of a rotor.

FIG. 1 is a perspective view of a rotor 1. The rotor 1 is rotatable about a central rotation axis 2 and has a rotor shaft 8 with an end pinion 24 and with first and second bearing seats 25 and 26. Between the bearing seats 25, 26, the rotor 1 comprises here (purely optionally six) rotor assemblies 4 on a shaft seating 27 (compare FIG. 2 to FIG. 4). Balancing disks 11, 12 are at each end on the rotor shaft 8, with a first balancing disk 11 on the pinion side of the rotor assemblies 4 and a second balancing disk 12 on the opposite side of the rotor assemblies 4. Each rotor assembly 4 comprises a laminated core 5 and a number of magnets 7 corresponding to the desired pole pair arrangement 6 (compare for example FIG. 6). The rotor 1 may have the dimensions and/or the function of a conventional rotor 28.

Figure 2:
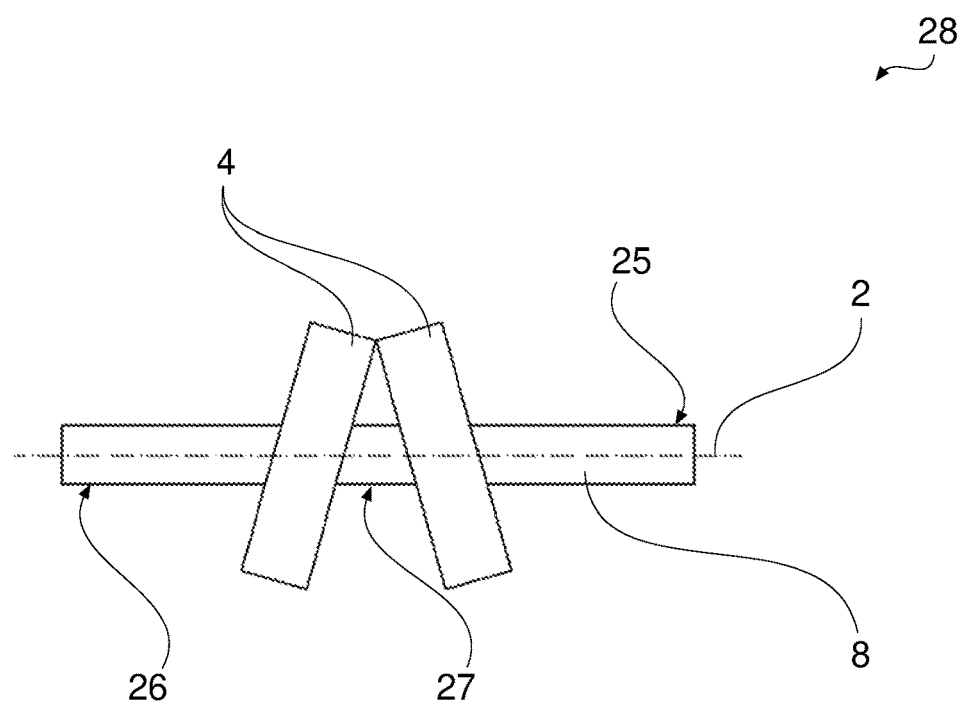
FIG. 2 is a schematic sectional view of a conventional rotor with a rotor shaft with two rotor assemblies.

FIG. 2 schematically shows a conventional rotor 28 with a rotor shaft 8, two end bearing seats 25, 26 and two rotor assemblies 4 on the axially central shaft seating 27. The rotor shaft 8 and the two rotor assemblies 4 may be designed conventionally. The axial runout 9 is the inclination of the plane of the rotor assembly 4 in relation to the rotation axis 2 (its own or that of the rotor shaft 8), and is shown exaggerated here for easier understanding. For the sake of simplicity, the rotation axis 2 is shown exactly centrally in the rotor shaft 8. In this example, two rotor assemblies 4 are positioned on the rotor shaft 8 to lie against one another with an axial runout 9 aligned oppositely in relation to one another. The rotor assemblies 4 are therefore inclined toward one another.

Figure 3:
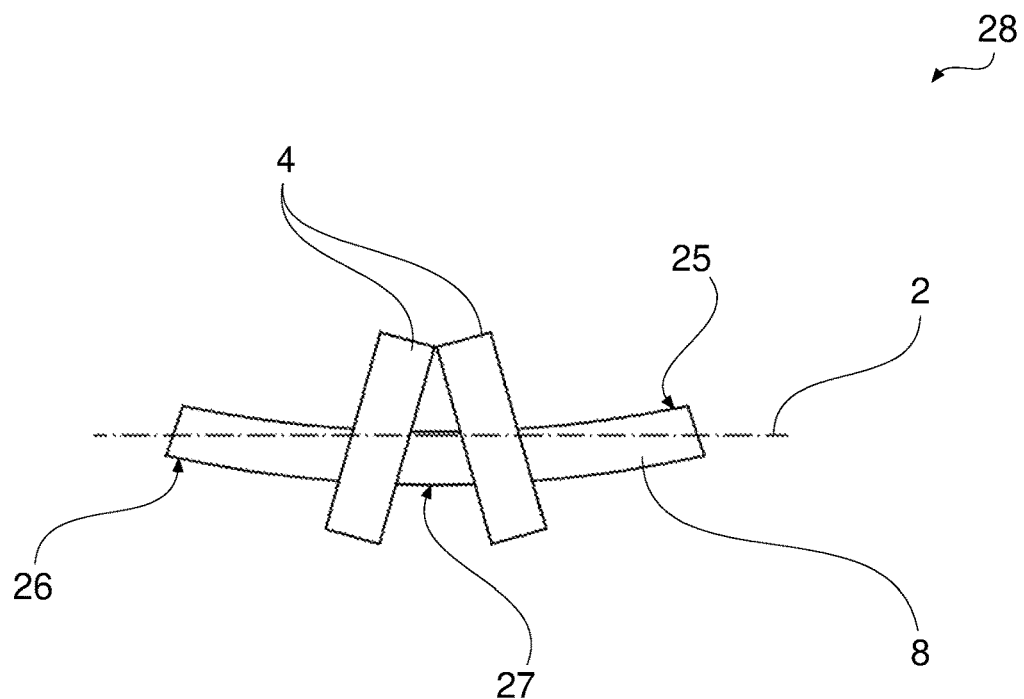
FIG. 3 illustrates the conventional rotor of FIG. 2 in a heated state.

FIG. 3 shows the conventional rotor 28 of FIG. 2 is shown in a heated state. In the heated state shown here (for example at operating temperatures in the range of from 120° C. to 160° C.), the rotor assemblies 4 expand. In combination with the oppositely aligned axial runout 9 of the rotor assemblies 4, the thermal expansion of the rotor assemblies 4 has the consequence of a bending moment (about the axis perpendicular to the plane of the image) on the rotor shaft 8. The bending moment of the laminated cores 5 induces an imbalance 13 of the rotor 1 about the rotation axis 2. The imbalance 13 of the rotor 1 about the rotation axis 2 is shown exaggerated for easier understanding. This is reversible, that is to say is compensated again by the temperature decreasing and the thermal expansion of the rotor assemblies 4 subsiding, or there may remain a plastic deformation of the rotor shaft 8 and/or at least one of the rotor assemblies 4.

Figure 4:
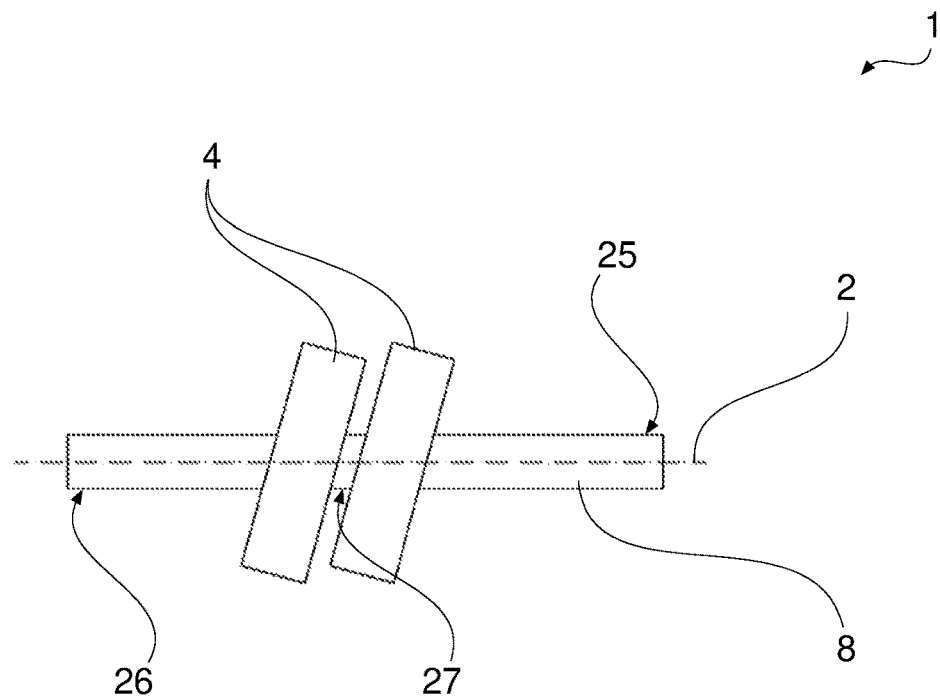
FIG. 4 is a schematic sectional view of a rotor with a rotor shaft and two rectified rotor assemblies.

FIG. 4 schematically shows a rotor 1 with a rotor shaft 8 with two rectified rotor assemblies 4. Without excluding generality and purely for the sake of overall clarity, the rotor 1 is to the greatest extent identical to the embodiment shown in FIG. 2, so that to this extent reference is made to the description there. In this embodiment, the rotor assemblies 4 are positioned on the rotor shaft 8 with rectified axial runout 9 (purely optionally of equal magnitude) in such a way that, when there is a thermal expansion of the two rotor assemblies 4 (at least resulting from the axial runouts 9), no bending moment acts on the rotor shaft 8. By means of the rectification of the axial runout 9 of the laminated cores 5, there is consequently no change, to very little change, in the imbalance of the rotor 1.

Figure 5:
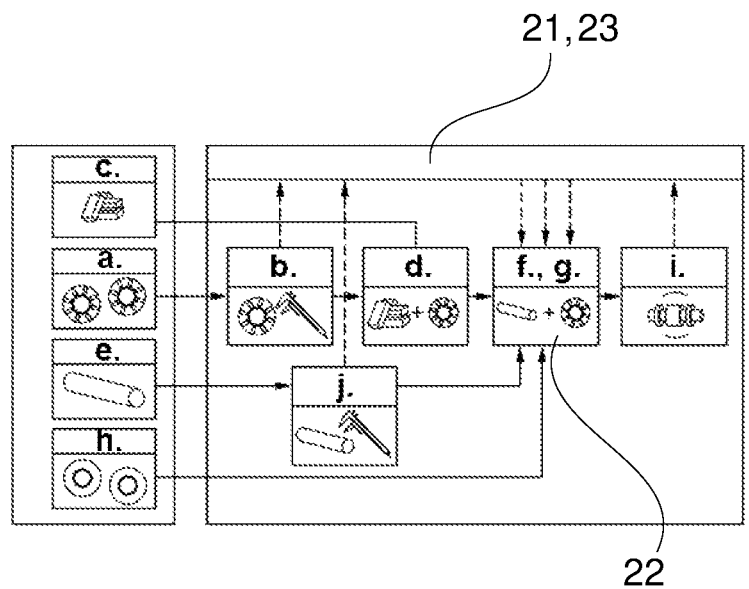
FIG. 5 diagrammatically illustrates an assembly method.

FIG. 5 is a diagram showing an assembly method. For the rotor 1 described herein and its components, reference is made purely by way of example to FIG. 1. In a first step a., laminated cores 5 are provided. In a step b., the laminated cores 5 are measured with respect to their axial runout 9 and preferably their eccentricity 10. In this case, the (first) measurement data are stored for later correlation. Here purely optionally, in a subsequent step c. the magnets 7 are provided. In a step d., in each case one of the laminated assemblies 5 and a corresponding number of magnets 7 are connected (permanently loosely for example by means of adhesive bonding) to form a rotor assembly 4. It should be pointed out that the magnets 7 are positioned in accordance with their poles aligned in a pole pair arrangement 6 within the laminated core 5.

In a further step e., a rotor shaft 8 is provided and in a step j. it is measured at least for its concentricity. The rotor shaft 8 is set up for receiving plural rotor assemblies 4 and at least one balancing disk 11, 12. In an assembly station 22, in a subsequent step f. the rotor shaft 8 and the rotor assemblies 4 are positioned in relation to one another (on the basis of the first measurement data from step b.). Subsequently, in step g. the rotor assemblies 4 are fixed on the rotor shaft 8, for example by means of shrink fitting. Here purely optionally, at the same time as step f. and step g., in a step h. (for example two) balancing disks 11, 12 are positioned on the rotor shaft 8 and fixed. In a subsequent step i., these balancing disks 11, 12 are machined according to the measured imbalance 13 (for example iteratively). Optionally, the initial measurements (preferably all of the measurements) are stored as (second) measurement data. Optionally, step i. also comprises an in-line artificial aging.

The measurement data of the rotor 1 determined in step i. are correlated together with the measurement data of the rotor assemblies 4 fixed on the rotor shaft 8 and the rotor shaft 8 itself, and also the relative position of the rotor assemblies 4 is correlated. The correlated measurement data may be stored and/or processed in an edge device 21 or a cloud 23, to be precise are integrated in a machine learning model so that a continual improvement in the sorting and/or orientation of the rotor assemblies 4 is set as an aim of the machine learning model.

Figure 6:
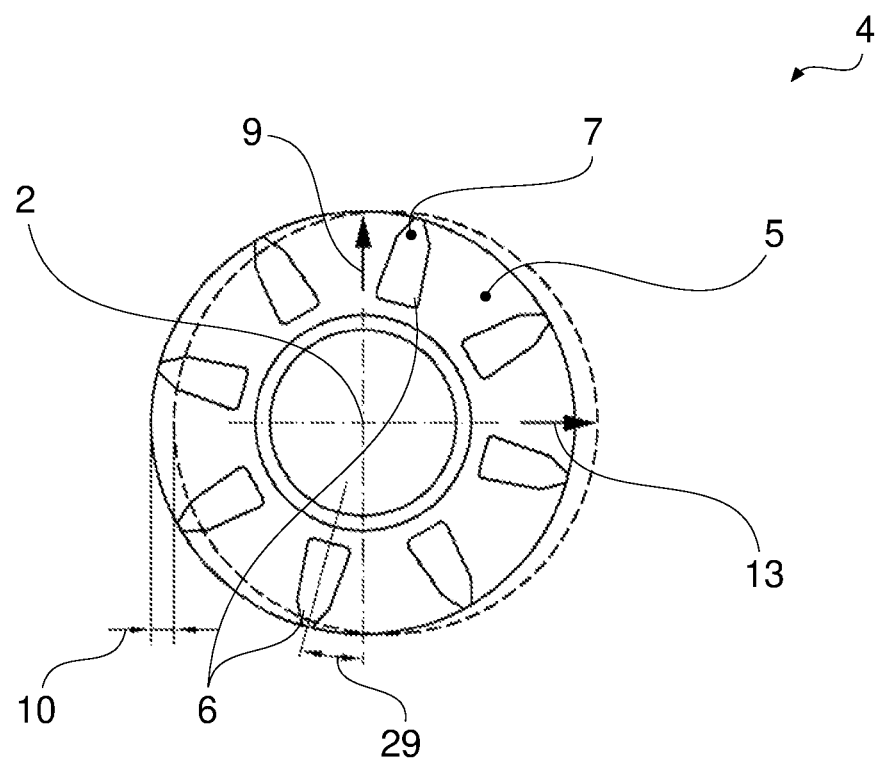
FIG. 6 is a schematic front view of a rotor assembly.

In FIG. 6, a rotor assembly 4 is shown in a schematic front view. In this case, the rotor assembly 4 comprises a laminated core 5 with magnets 7 (here six) incorporated within the laminated core 5 in a 120° pole pair arrangement 62. In this case, for production-related reasons, the laminated core 5 (and consequently the rotor assembly 4) has a deviation of the concentricity (eccentricity 10) from the rotation axis 2, which leads to an imbalance 13. Moreover, the laminated cores 5 have an axial runout 9, namely an inclination of the plane of the laminated core 5 in relation to its rotation axis 2 or the rotation axis 2 of the rotor shaft 8 (compare FIG. 4). The angular position of the axial runout 9 is determined by a pole deviating angle 29. This represents a deviation that cannot be compensated in the rectification of the axial runout 9, on the assumption that the axial runout 9 of the other rotor assembly 4 has a pole deviating angle 29 of zero.

Figure 7:
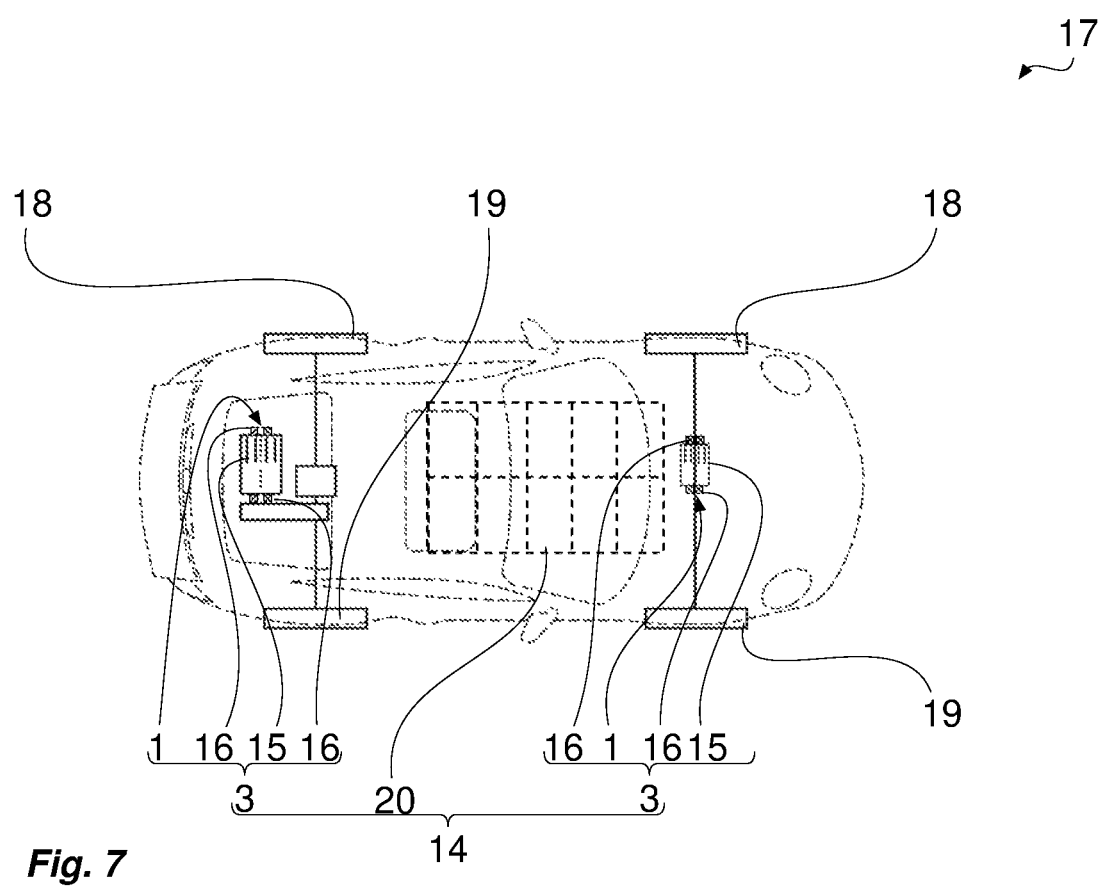
FIG. 7 is a plan view of a motor vehicle with electric drive machines.

In FIG. 7, a motor vehicle 17 with an electric drive machine 3 is shown in a purely schematic plan view. The drivetrain 14 optionally has two drive machines 3 with a first set up as a rear drive and a second is set up as a front drive. The drive machines 3 are connected in a torque-transferring manner to a left propulsion wheel 18 and a right propulsion wheel 19 of a common wheel axle. For example, the drivetrain 14 of the motor vehicle 17 can consequently be operated in all-wheel drive or just by means of rear drive or front drive. Both drive machines 3 comprise a rotor 1 that is set up for rotation within a corresponding stator 15. In this case, the rotor 1 is mounted on a shaft mounting 16. Provided for supplying voltage to the (electric) drive machines 3 is a traction battery 20, which is for example arranged in the floor of the motor vehicle 17. Preferably, at least one of the electric drive machines 3 is set up alone or additionally for the recuperation of deceleration energy (braking), and consequently for charging the traction battery 20.

With the rotor proposed here, a thermally induced change in the imbalance can be reduced significantly.

What is claimed is:

1. An assembly method for a rotor (1), comprising:
providing a plurality of laminated cores (5);
measuring the laminated cores (5) to determine relative concentricity and axial runout;
providing magnets (7);
respectively connecting one of the laminated cores (5) to a corresponding number of the magnets (7) to form a rotor assembly (4) with a specified pole pair arrangement (6);
providing a rotor shaft (8) having opposite longitudinal ends and a longitudinal center part between the longitudinal ends;
positioning the rotor shaft (8) and the rotor assemblies (4) in relation to one another so that the rotor assemblies (4) that have greater eccentricity are positioned closer to the longitudinal ends of the rotor shaft (8) and the rotor assemblies (4) that have lesser eccentricity are closer to the longitudinal center part of the rotor shaft (8); and
fixing the rotor shaft (8) and the rotor assemblies (4) to one another to form a rotor (1), the rotor assemblies (4) being positioned on the rotor shaft (8) when positioning the rotor shaft (8) and the rotor assemblies (4) in relation to one another such that they are rectified in accordance with respective axial runouts (9) determined when measuring the laminated cores (5), while taking into account the pole pair arrangement (6).

2. The assembly method of claim 1, wherein before the positioning of the rotor shaft (8) and the rotor assemblies (4) in relation to one another, the method further comprises sorting a multiplicity of the rotor assemblies (4) based on their respective axial runout (9), and the positioning of the rotor shaft (8) and the rotor assemblies (4) in relation to one another is carried out based on the sorting of the rotor assemblies (4) in accordance with their respective axial runout (9).

3. The assembly method of claim 1, wherein the positioning of the rotor shaft (8) and the rotor assemblies (4) in relation to one another comprises positioning the rotor assemblies (4) on the rotor shaft (8) in accordance with their eccentricity (10) as determined when measuring the laminated cores (5), and the method further comprising orienting the rotor assemblies (4) in accordance with their axial runout (9) and in a sequence corresponding to their axial runout.

4. The assembly method of claim 1, further comprising positioning at least one balancing disk (11, 12) on the rotor shaft (8) and machining the balancing disk according to a measured imbalance (13).

5. The assembly method of claim 1, wherein the rotor (1) is measured to obtain measurement data of the rotor (1), and wherein the fixing of the rotor shaft (8) and the rotor assemblies (4) to one another is carried out to correlate with the measurement data, and wherein the measurement data are integrated in a machine learning model.

6. A computer program, comprising a computer program code that is capable of being run on at least one computer in such a way that the computer is made to carry out the assembly method of claim 1, at least one of the computers:
being integrated in an edge device (21) of an assembly station (22) as an assembly computer or a component of an assembly computer; and
being set up for communication with a cloud (23) on which the computer program code is provided.

7. A computer program product on which a computer program code is stored, the computer program code being capable of being be run on at least one computer such that the at least one computer is made to carry out the assembly method of claim 1, at least one of the computers:
being integrated in an edge device (21) of an assembly station (22), as an assembly computer or a component of an assembly computer; and
being set up for communication with a cloud (23) on which the computer program code is provided.

8. The assembly method of claim 1, wherein the rotor assemblies (4) that have a greater axial runout are positioned closer to the longitudinal ends of the rotor shaft (8) and the rotor assemblies (4) that have lesser axial runout are closer to the longitudinal center part of the rotor shaft (8).

* * * * *